United States Patent [19]

Passiniemi

[11] Patent Number: 4,651,981
[45] Date of Patent: Mar. 24, 1987

[54] FORCE LIMITER

[75] Inventor: Eric Passiniemi, Vancouver, Canada

[73] Assignee: Devron Engineering Ltd., Vancouver, Canada

[21] Appl. No.: 621,427

[22] Filed: Jun. 18, 1984

[51] Int. Cl.[4] .............................................. F16f 1/34
[52] U.S. Cl. .................................................. 267/162
[58] Field of Search ................ 267/70, 136, 137, 162, 267/164

[56] References Cited

U.S. PATENT DOCUMENTS 2,981,511  4/1961  Suozzo ............................ 267/162 X
3,375,000  3/1968  Seamands et al. .................. 267/162

FOREIGN PATENT DOCUMENTS 1013535  4/1952  France ............................... 267/162
1195202  5/1959  France ............................... 267/162

Primary Examiner—Duane A. Reger
Attorney, Agent, or Firm—Christie, Parker & Hale

[57] ABSTRACT

A force limiter to be interposed between an actuator and a device to be moved by the actuator to limit the force applied by the actuator. The force limited has a body having a chamber and open at at least one end. There is a piston slidable within the body. A piston rod extends from the piston through, and slidable within, the open end of the body. Resilient members such as Belleville washers are positioned in the chamber between the piston and an end of the chamber away from the piston. The resilient members are calibrated to provide the necessary force limit and are able to apply that force limit in both directions of movement of the actuator. The force limiter can be attached to the actuator.

13 Claims, 2 Drawing Figures

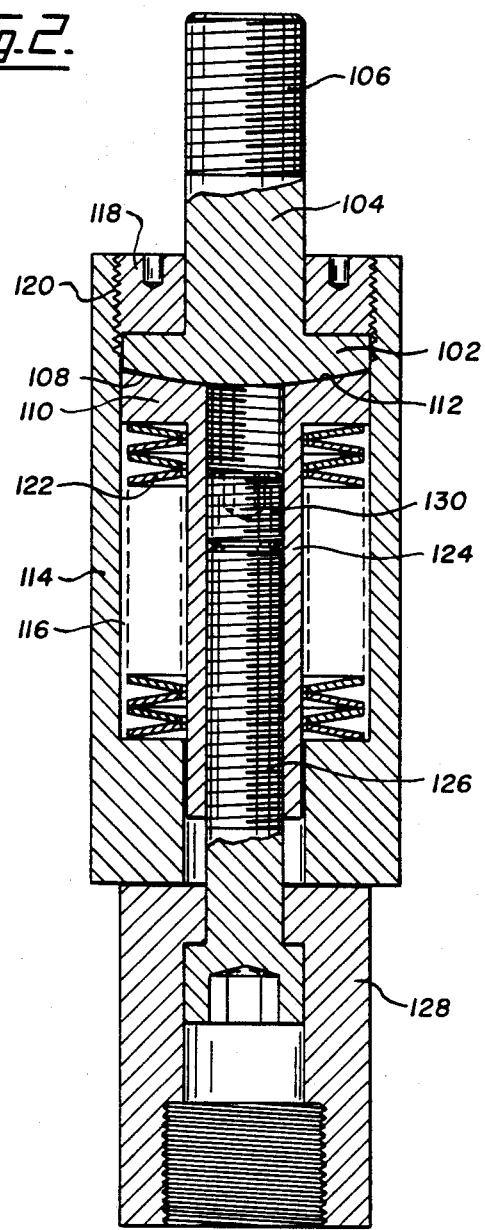

FORCE LIMITER

FIELD OF THE INVENTION

This invention relates to a force limiter.

DESCRIPTION OF THE PRIOR ART

Actuators are widely used to position a device in industrial applications. The actuators are required to apply sufficient force to the device to obtain or maintain a required position for the device. However under certain conditions an excessive force may be provided by the actuator and the device that is to be controlled can thus be damaged. This excessive force can be produced by, for example, an inaccurate position request to the actuator or by some internal problem in the device itself.

One way of avoiding excessive force being applied by the actuator is to place a force limiter between the actuator and the device. Such limiters are known. For example a device to limit the force applied to the lip of a head box by an actuator is described in U.S. patent application No. 501,530 filed June 6, 1983 by Norman Dove.

Force limiters are particularly desirable in a slice lip control system on a paper machine head box. The slice lip is a long continuous bar, usually of stainless steel, with actuators attached at small spacings, typically six inches along the length. The actuators bend the bar into a complex shape to control the cross machine distribution of pulp slurry onto the wire upon which the paper is made. In this arrangement it is possible to bend the slice lip beyond the yield point of the material of the lip and thus permanently deform it. This is extremely undesirable. Not only is the lip expensive to replace the paper machine must, of course, be stopped while the necessary work is carried out.

With automated head box slice lip control having a position feedback, for example a computer controlled operation, a bend limit safety check is performed by the computer software to prevent adjacent actuators from differing in position by more than a predetermined amount. This safety feature, however, cannot prevent the situation in which an operator overrides the system manually. Further, if the software malfunctions incorrect actuator movement can result. It is therefore necessary to build into the system a self contained means to limit the force applied, that is independent of the control system applying the force.

The above excessive actuator movements beyond design values can be either tension or compression and it is therefore necessary to have the force limiter effective in both directions. For example in the above patent application by Norman Dove there are, in effect, two force limiters shown in a coupling between the lip of a head box and the actuator, one to control downward force, one to control upward force. In this way excess actuator movement is absorbed in both directions as the slice lip is maintained within its correct elasticity tolerances.

Known force limiters are almost invariably spring loaded devices. The spring is preloaded to a so-called kickoff force. Any force acting on the device that is less than the kickoff force only relieves strains in the device body and has no noticable affect on the length of the linkage between the actuator and the device. However when the kickoff force is exceeded the springs begin to compress to absorb excess movement and thus prevent unacceptable force increase.

There are many instances in which the force limiter is required to act equally in both tension and compression, that is in both directions. However with the use of two springs such an arrangement can be difficult. It is difficult to get two springs to match each other precisely in characteristics.

SUMMARY OF THE INVENTION

The present invention seeks to provide a force limiter to be interposed between an actuator and a device to be moved by the actuator to limit the force applied by the actuator, whether that force be applied upwardly or downwardly, that is in compression or tension.

The invention finds application wherever a force limiter is required, that is between an actuator and a device to be moved by the actuator where the actuator may apply excessive force. The present specification describes principally its application in the control of the slice lip on a paper making machine head box merely for convenience.

Accordingly the present invention is a force limiter to be interposed between an actuator and a device to be moved by the actuator to limit the force applied by the actuator, the force limiter comprising a body attachable to the actuator; a main chamber in the body; a subchamber adjacent the main chamber; a piston in the subchamber that is a close fit within the subchamber; a piston rod extending from the piston; a transition retainer attached to the distal end of the piston rod, the transition retainer being a slidable fit in the body; resilient means interposed between the plunger and the transition retainer; an extension rod extending from the transition retainer to the device to be moved, the resilient means being calibrated to provide the necessary force limit and able to apply that force limit in both directions of movement of the actuator.

DRAWINGS

Aspects of the invention are illustrated, merely by way of example, in the accompanying drawings in which:

FIG. 1 is a section through a force limiter according to the present invention in its useful position; and FIG. 2 is a section through a further embodiment of the invention.

DESCRIPTION OF THE PREFERRED EMBODIMENT

Figure 1:
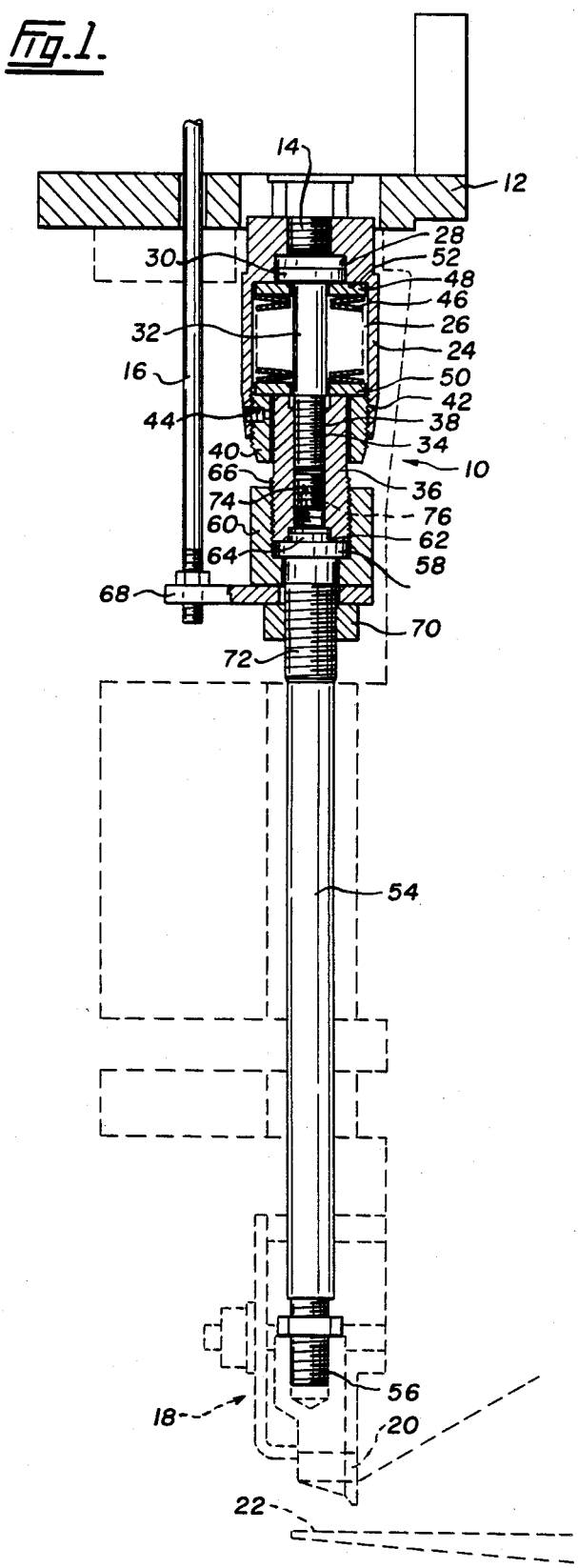

FIG. 1 shows a force limiter 10 mounted in its upper end on a frame 12 and adapted to be attached to an actuator mounted on the frame 12 (but not shown) by thread 14 at the end of the actuator. Rod 16 extends from the limiter 10 to a sensing device (not shown) whereby the movement of the limiter 10, under the influence of the actuator, can be assessed. This is conventional and not relevant to the present invention.

There is a coupling 18, shown only in broken lines, attached to the lip 20 of a head box on a paper making machine. The limiter 10 is attached to the movable upper slice lip. The lower slice lip 22, which is usually fixed, is also shown in broken lines in the drawing. A further description of the slice lip and its attachment is not deemed necessary. A coupling to attach the lip of a head box on a paper making machine is described and claimed in the above U.S. patent application No.

501,530 by Norman Dove. The disclosure of that application is incorporated here by reference.

The force limiter 10 comprises a body 24 attachable by provided threaded opening 14 in its top to an actuator. There is a main chamber 26 in the body 24 and a subchamber 28 adjacent the main chamber 26. There is a piston 30 in the subchamber 28 that is a close fit within the subchamber. Piston rod 32 extends downwardly from the piston 30, through the main chamber 26 and is provided with a threaded portion 34 at its lower end. The threaded portion 34 engages in a transition retainer 36 provided with an internal thread 38 to engage threaded portion 34. The transition retainer 36 is a slide fit within a sleeve 40 that is threaded at 42 to engage within the lower end of the body 24. Grub screw 44 acts to locate the sleeve 40 relative to the body 24.

In the main chamber 26 resilient means in the form of a plurality of Belleville washers 46 are arranged in a column. The upper end of the Belleville washer column abuts distance piece 48. At the lower end the Belleville washers abut distance piece 50, which is in contact with the sleeve 40 and the transition retainer 36. The upper distance piece 48 is in contact with a shoulder 52 between the main chamber 26 and the subchamber 28 and with the lower surface of the piston 30.

There is an extension rod 54 extending from the transition retainer 36 downwardly to threaded end 56 where it is engaged in the lip coupling 18. At its upper end the extension rod 54 is provided with a flange 58 engaged within cap 60, which is threaded onto the transition retainer 36. To facilitate location the transition retainer 36 is provided with a bottom recess 62 to engage on an upper portion 64 of the extension rod 54. The flange 58 is located between the cap 60 and the transition retainer 36 by tightening cap 60 onto external threaded portion 66 of the transition retainer 36. Rod 16 is attached to bracket 68 which abuts the outer, lower surface of the cap 60 and is maintained in that position by nut 70 engaged on threaded portion 72 of the extension rod 54.

In order to eliminate backlash in the threaded connection between portion 34 of piston rod 32 and internal thread 38 of the transition retainer 36 grub screw 74 is engaged within the lower part of thread 38. The grub screw 74 is provided with a hexagonal recess 76 so that it may be tightened in internal thread 38 in transition retainer 36 against the lower part of the piston rod 34 to eliminate backlash.

Concerning the relative dimensions of the illustrated apparatus the subchamber 28 is of a depth to allow the piston 30 to move a greater distance than the distance moved by the Belleville washers 46 when the limiter 10 is overloaded. The Belleville washers 46 are calibrated to a predetermined value. The calibration is carried out by preloading the washers 46 depending on the desired kickoff point.

In operation it should, of course, first be noted that the calibration of the Belleville washers is such that when the force is below the predetermined kickoff force the illustrated apparatus acts as a solid rod. However should a fault of any kind develop and excessive force be applied downwardly, then when that force exceeds the kickoff force the Belleville washers compress. In normal operation the body 24 transmits push movement through the Belleville washers 46 and distance pieces 48 to transition retainer 60, and thus the extension rod 54. Pulling movement is transmitted through the body 24 and the collar 42 and the Belleville washers 46.

When the kickoff force is exceeded then the piston 30 is free to travel in both directions. Accurate machining of the piston 30 provides guidance to prevent sideways movement. Similarly transition retainer 36 must be a close sliding fit within collar 40, to eliminate sideways movement.

In FIG. 2 a first piston 102, attached to rod 104 provided with thread 106 to allow attachment to an actuator has a curved undersurface 108. A second piston 110 has an angled or correspondingly curved upper surface 112. This provision of curved surface 108 and angled surface 112 is a particular advantage of the embodiment of FIG. 2. These surfaces eliminate the need for the distance pieces 48 and 50 in the FIG. 1 embodiment. These distance pieces 48 and 50 must be carefully machined to avoid misalignment of the resilient washers 46 but the curved surfaces 108 and 112 provide line contact and eliminate the possibility of any misalignment. This of course facilitates adjustment precompression of the washers 46.

The FIG. 2 embodiment has a body 114 having a chamber 116 closed by top 118 threadedly attached at 120. Belleville washers 122 abut piston 102 and surround rod 124 extending from the piston 110. The rod 124 is internally threaded to receive bolt 126 to attach coupler 128 to provide a means of attaching to a rod such as rod 54 in FIG. 1. Screw 130 eliminates backlash in the threaded attachment of bolt 126.

The operation of the FIG. 2 embodiment is precisely as described for the FIG. 1 embodiment.

The present invention thus provides a simple force limiter in which the kickoff force in both directions is the same. Belleville washers are shown as the resilient means but coil or conical springs may be used to control the kickoff force in both directions. Fluid pressure can also be used. For example air pressure could be used, using the size of a reservoir to relate force to deflection character. An incompressible liquid could act against a counterweight to keep the force constant for the whole stroke.

In addition to the described use in a paper machine the device finds use in limiting the seating force of a valve to prevent damage to the seat at the closed position and to control accurately the use of mechanical forces in robotics.

I claim:

1. A force limiter to be interposed between an actuator and a device to be moved by the actuator to limit the force applied by the actuator, the force limiter comprising:

a body having a main chamber and open at at least one end;

a first piston slidable within the body;

a piston rod extending from the piston and extending through and slidable within the open end of the body;

resilient means in the main chamber between the first piston and an end of the main chamber, remote from the first piston, the resilient means being calibrated to provide the necessary force limit and able to apply that force limit in both directions of movement of the actuator, the resilient means being so calibrated that the force limiter acts as a solid rod up to the calibrated force limit, provides the necessary force limit and is able to apply that force limit in both directions of movement of the actuator;

a subchamber adjacent the main chamber;

the first piston being in the subchamber;

a transition retainer threadedly attached to the distal end of the piston rod and including means to eliminate backlash in the threaded attachment, the transition retainer being a slidable fit in the body;

the resilient means being interposed between the piston and the transition retainer;

an extension rod extending from the transition retainer to the device to be moved;

means to attach the force limiter to the actuator; and means to attach the force limiter to the device.

2. A force limiter as claimed in claim 1 in which the resilient means comprises a plurality of Belleville washers.

3. A force limiter as claimed in claim 1 in which the resilient means is a spring.

4. A force limiter as claimed in claim 1 including a first distance piece interposed between the resilient means and the piston and a second distance piece interposed between the resilient means and the transition retainer.

5. A force limiter as claimed in claim 1 in which the subchamber is of smaller diameter than the main chamber and of a depth to allow the piston to move a greater distance than the distance moved by the resilient means on overload.

6. A force limiter as claimed in claim 1 including a collar secured in the end of the body, remote from the subchamber, the transition retainer being of a close slidable fit within the collar.

7. A force limiter as claimed in claim 6 including attachment means to prevent movement of the collar relative to the body.

8. A force limiter as claimed in claim 1 in which the transition retainer is threaded externally at the piston end;

a cap threadedly attached to the transition retainer;

the extension rod extending through the cap, the cap acting to force the transition retainer against the extension rod.

9. A force limiter as claimed in claim 1 in which the piston rod is externally threaded;

an internal threaded passageway in the transition retainer engaging the external thread of the piston rod;

a grub screw receivable in the open end of the transition retainer passageway whereby once the piston rod is engaged in the transition retainer the grub screw can be tightened against the piston rod to eliminate backlash.

10. A force limiter as claimed in claim 1 in which the means to attach the force limiter to the actuator comprises a first rod attachable to the actuator and extending into the chamber;

a second piston within the chamber, attached to the first rod and abutting the first piston.

11. A force limiter as claimed in claim 10 in which the abutting surfaces of the first and second pistons are correspondingly curved to facilitate alignment of the pistons and thus the resilient means.

12. A force limiter as claimed in claim 1 in which the piston rod is internally threaded;

a connector bolted to the piston rod by a bolt engaging the internal thread;

means to eliminate the backlash in the attachment of the bolt to the piston rod.

13. A force limiter as claimed in claim 12 in which the means to eliminate backlash comprises a screw engaged in the internal thread to abut the bolt and to apply sufficient force to the bolt to eliminate backlash.

* * * * *